United States Patent
Schofield

(10) Patent No.: US 7,517,511 B2
(45) Date of Patent: Apr. 14, 2009

(54) METHOD AND APPARATUS FOR MITIGATING MERCURY EMISSIONS IN EXHAUST GASES

(75) Inventor: Keith Schofield, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 646 days.

(21) Appl. No.: 10/429,114

(22) Filed: May 1, 2003

(65) Prior Publication Data

US 2004/0219083 A1  Nov. 4, 2004

(51) Int. Cl.
*B01D 53/94* (2006.01)

(52) U.S. Cl. ............... 423/213.5; 423/99; 423/103; 423/106; 423/107; 423/210; 423/212; 423/213.2

(58) Field of Classification Search ............ 423/99, 423/100, 103, 106, 107, 210, 212, 213.2, 423/213.5

See application file for complete search history.

(56) References Cited

U.S. PATENT DOCUMENTS

| | | | | |
|---|---|---|---|---|
| 3,692,497 A | * | 9/1972 | Keith et al. | 422/179 |
| 3,896,616 A | * | 7/1975 | Keith et al. | 60/274 |
| 3,923,011 A | * | 12/1975 | Pfefferle | 123/1 R |
| 3,940,923 A | * | 3/1976 | Pfefferle | 60/777 |
| 3,948,611 A | * | 4/1976 | Stawsky | 422/179 |
| 4,011,839 A | * | 3/1977 | Pfefferle | 123/1 R |
| 4,142,864 A | * | 3/1979 | Rosynsky et al. | 422/179 |
| 4,500,327 A | | 2/1985 | Nishino et al. | |
| 4,579,726 A | | 4/1986 | Kuivala et al. | |
| 4,591,490 A | | 5/1986 | Horton | |
| 4,708,853 A | | 11/1987 | Matviya et al. | |
| 4,729,882 A | | 3/1988 | Ide et al. | |
| 4,843,102 A | | 6/1989 | Horton | |
| 4,889,698 A | | 12/1989 | Moller et al. | |
| 4,966,763 A | * | 10/1990 | Skinner | 423/491 |
| 5,009,871 A | | 4/1991 | Higuchi et al. | |
| 5,409,522 A | * | 4/1995 | Durham et al. | 75/670 |
| 5,569,436 A | | 10/1996 | Lerner | |
| 5,607,496 A | * | 3/1997 | Brooks | 75/670 |
| 5,672,323 A | | 9/1997 | Bhat et al. | |
| 5,695,726 A | | 12/1997 | Lerner | |
| 5,787,823 A | | 8/1998 | Knowles | |
| 5,827,352 A | | 10/1998 | Altman et al. | |
| 5,900,042 A | | 5/1999 | Mendelsohn et al. | |

(Continued)

FOREIGN PATENT DOCUMENTS

DE  4315138 C1  7/1994

(Continued)

OTHER PUBLICATIONS

European Patent Office, Munich, European Search Report for European Patent Application No. EP 04 76 0544 dated on Nov. 27, 2007, 3 pages.

*Primary Examiner*—Steven Bos
*Assistant Examiner*—Paul Wartalowicz
(74) *Attorney, Agent, or Firm*—Daniel L. Dawes

(57) ABSTRACT

Mercury emissions in an exhaust gas are mitigated. Mercury dichloride is formed upon a surface from a substantial portion of the mercury in the exhaust gas. The mercury dichloride sublimes from the surface, and the sublimed mercury dichloride is subsequently removed from the exhaust stream.

11 Claims, 3 Drawing Sheets

U.S. PATENT DOCUMENTS

| | | | |
|---|---|---|---|
| 6,027,551 A | 2/2000 | Hwang et al. | |
| 6,103,205 A | 8/2000 | Wojtowicz et al. | |
| 6,136,281 A * | 10/2000 | Meischen et al. | 423/210 |
| 6,136,749 A | 10/2000 | Gadkaree et al. | |
| 6,214,304 B1 | 4/2001 | Rosenthal et al. | |
| 6,284,208 B1 | 9/2001 | Thomassen | |
| 6,322,613 B1 | 11/2001 | Wojtowicz et al. | |
| 6,328,911 B1 * | 12/2001 | Schofield | 252/389.54 |
| 6,372,187 B1 | 4/2002 | Madden et al. | |
| 6,375,909 B1 | 4/2002 | Dangtran et al. | |
| 6,447,740 B1 | 9/2002 | Caldwell et al. | |
| 6,475,451 B1 | 11/2002 | Leppin et al. | |
| 2001/0043889 A1 | 11/2001 | Downs et al. | |
| 2002/0033097 A1 | 3/2002 | El-Shoubary et al. | |
| 2002/0068030 A1 | 6/2002 | Nolan et al. | |
| 2002/0102189 A1 | 8/2002 | Madden et al. | |
| 2002/0114749 A1 | 8/2002 | Cole | |
| 2002/0114750 A1 | 8/2002 | Holste et al. | |
| 2002/0124731 A1 | 9/2002 | El-Shoubary et al. | |
| 2003/0170159 A1 | 9/2003 | Honjo et al. | |

FOREIGN PATENT DOCUMENTS

| | | |
|---|---|---|
| DE | 4422661 A1 | 1/1996 |
| JP | 03023102 B1 | 3/2000 |
| WO | WO 2004098738 A2 | 11/2004 |

* cited by examiner

METHOD AND APPARATUS FOR MITIGATING MERCURY EMISSIONS IN EXHAUST GASES

BACKGROUND OF THE INVENTION

1. Field of the Invention

The present invention relates generally to the removal of undesirable emissions in exhaust gases. The present invention relates more particularly to a method and apparatus for mitigating mercury emissions in an exhaust gas, wherein mercury dichloride is formed upon a surface from a substantial portion of the mercury in the exhaust gas, the mercury dichloride sublimes from the surface, and the sublimated mercury dichloride is removed from the exhaust stream.

2. Description of the Prior Art

The 1990 Clean Air Amendments reintroduced the growing concerns over anthropogenic emissions of mercury into the atmosphere and subsequently into the food chain. As a result, in recent years there has been increasing research activity with respect to this problem, particularly after the U.S. Environmental Protection Agency's decision to regulate mercury emissions from power plants by the end of 2007.

At present, no effective method exists to control these emissions. Although a significant number of patents have been granted in relation to this problem, as will be seen, none of them has proven to be satisfactorily effective. A practical solution is still being sought with a growing sense of urgency.

Presently, the nature of the chemistry of mercury in cooling exhaust gases which are the result of higher temperature processes remains ill defined. Its natural and anthropogenic emission sources, however, are well established. Throughout the industrialized age, these man made emissions have accumulated in the environment to such a point that they have sadly become a major part of what is referred to as the natural background.

Anthropogenic mercury is emitted mainly as elemental mercury vapor that is relatively unreactive in the gas phase of exhaust emissions or in the atmosphere. This is essentially why it is hard to control, since absorbents are not very effective at retaining elemental mercury vapor, which is extremely volatile.

In the atmosphere, elemental mercury vapor's lifetime is about a year. This is how long it takes before the elemental mercury vapor is finally washed out of the atmosphere. Consequently, its dispersal is global, with subsequent international and political repercussions.

The major emission sources of mercury have been listed in a recent report of the United Nations Environmental Program (*Chem. & Eng. News* 81:(6) 20(2003)). Coal combustion is the largest source, with municipal and medical waste incineration also playing major roles. The combustion of oil makes about a 10% additional contribution (Wilhelm, S. M., *Environ. Prog.* 18:130(1999), *Environ. Sci. Technol.* 35:4704(2001)). Other significant sources are metal smelters, cement producers, the chloralkali process that uses mercury electrodes and some gold mining activities (Pirrone, N., et al. *Atmos. Environ.* 30:2981(1996), Pai, P., et al. *Fuel Process. Technol.* 65:101(2000)).

The chemistry of mercury is somewhat unique among the elements. Mercury forms few strongly bound molecules. In the gaseous phase, most elements convert readily to stable gaseous oxides, hydroxides or halides. Mercury, however, has only a very weakly bound gaseous oxide, hydroxide and monohalides. As a result, in any high temperature medium the mercury present in any fuel becomes elemental atomic mercury in the hot gases. Its only stable gaseous molecule of significance in combustion is the dichloride ($HgCl_2$). This is exceptional, having a first bond strength dissociation energy, $D_0(HgCl-Cl)$, of about 360 kJ/mol.

However, the dilemma centers on the fact that, although thermodynamically favored, the formation of mercury dichloride is kinetically constrained at lower temperatures and it cannot be formed at higher temperatures in the gas phase. No direct channels exist to convert atomic mercury directly into mercuric chloride in the gas phase (Hranisavljevic, J., et al. *J. Phys. Chem.* A 101:2323(1997), Ariya, P. A. et al., ibid. 106:7310(2002)).

In the gas phase, the formation needs to proceed through an intermediate such as the gaseous oxide, hydroxide, or the monochloride. These are not present to play this role. When the temperatures are sufficiently low for them to become viable, the energy barriers have frozen any gas phase formation kinetic reactions. However, what is seen in practice, is that a small fraction of the mercury present in exhausts is, in fact, present as mercury dichloride.

After very extensive chemical kinetic modeling studies, this partial conversion remains a mystery. Researchers tend to summarize their failures by indicating that the chemistry must be far more complex (Laudel, D. L. et al., *Fuel Process. Technol.* 65:157(2000), Niksa, S., et al., *J. Air & Waste Manage. Assoc.* 52:894(2002)).

Research at present and in recent years has placed emphasis on finding which flue gas constituent affects this mercury fractional speciation between atomic mercury and mercury dichloride. The important practical factor being that whereas the atomic mercury is very difficult to capture, the dihalide is readily soluble in water. It can be removed easily along with gases such as sulfur dioxide with water mist scrubbers in the final, cooler exhaust sections.

What is evident, at present, is that fly ash appears to play some role in modifying this ratio, as do possibly the presence of gases such as sulfur dioxide, nitric oxide, nitrogen dioxide, chlorine and hydrogen chloride (Laudel, D. L. et al., *Fuel Process. Technol.* 65:157(2000), Liu, K., *Energy & Fuels*, 15:1173(2001), Niksa, S., et al., *Environ. Sci. Technol.* 35:3701(2001), Fujiwara, N., et al., *Fuel,* 81:2045(2002), Norton, G. A., *Fuel,* 82:107(2003)). The rate of cooling of the exhaust gases also appears to be a parameter that has some effect (Sliger, R. N., *Fuel Process. Technol.* 65:423(2000), Niksa, S., et al., *Environ. Sci. Technol.* 35:3701(2001)). The data are very inconsistent. No specific correlations have emerged and engineers remain in the dark concerning why this speciation varies, is unpredictable and how it occurs.

There are several U.S. patents and patent applications that relate to controlling mercury emissions in exhaust gases. These methods are based either on adsorption or absorption of the atomic mercury, or making an addition to the stack gases. Ide, et al. (U.S. Pat. No. 4,729,882), and Caldwell, et al. (U.S. Pat. No. 6,447,740) suggest adding chlorine followed by water wash scrubbing. Dangtran et al. (U.S. Pat. No. 6,375,909) suggest adding calcium chloride to the combustor with subsequent wet scrubbing. Downs et al. (Published U.S. Patent Application No. 20010043889) suggest adding hydrogen sulfide gas, Holste (Published U.S. Patent Application No. 20020114750) various forms of sulfur, and Cole (Published U.S. patent application Ser. No. 20020114749) gaseous oxidizing agents all followed by wet scrubbers. All the other patents use a variety of absorbing materials to try and capture the atomic mercury.

None of the above mentioned methods have proven to be sufficiently effective. In an attempt to overcome the deficiencies of the prior art, the Electric Power Research Institute (EPRI) in Palo Alto, Calif., is currently testing an additional absorption method. This method uses gold coated metal plates suspended in the stack gases, which are intended to absorb the mercury by amalgamation. The method will probably be more successful than previous methods, but still will be expensive to install, operate and maintain. Thus, all contemporary methodologies and devices for mitigating mercury emissions in exhaust gases possess inherent deficiencies which detract from their overall effectiveness and desirability.

As such, although the prior art has recognized, to a limited extent, the need to mitigate mercury emissions in exhaust gases, the proposed solutions have, to date, been ineffective in providing a satisfactory remedy. Therefore, it is desirable to provide a method and apparatus for mitigating mercury emissions in exhaust gases which is both effective and which can be economically installed, operated and maintained.

BRIEF SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The present invention specifically addresses and alleviates the above mentioned deficiencies associated with the prior art. More particularly, the present invention comprises a method and apparatus for mitigating mercury emissions in an exhaust gas, wherein mercury dichloride is formed upon a surface from a substantial portion of the mercury in the exhaust gas, the mercury dichloride sublimes from the surface, and the sublimated mercury dichloride is removed from the exhaust stream. The present invention is both effective and economical.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
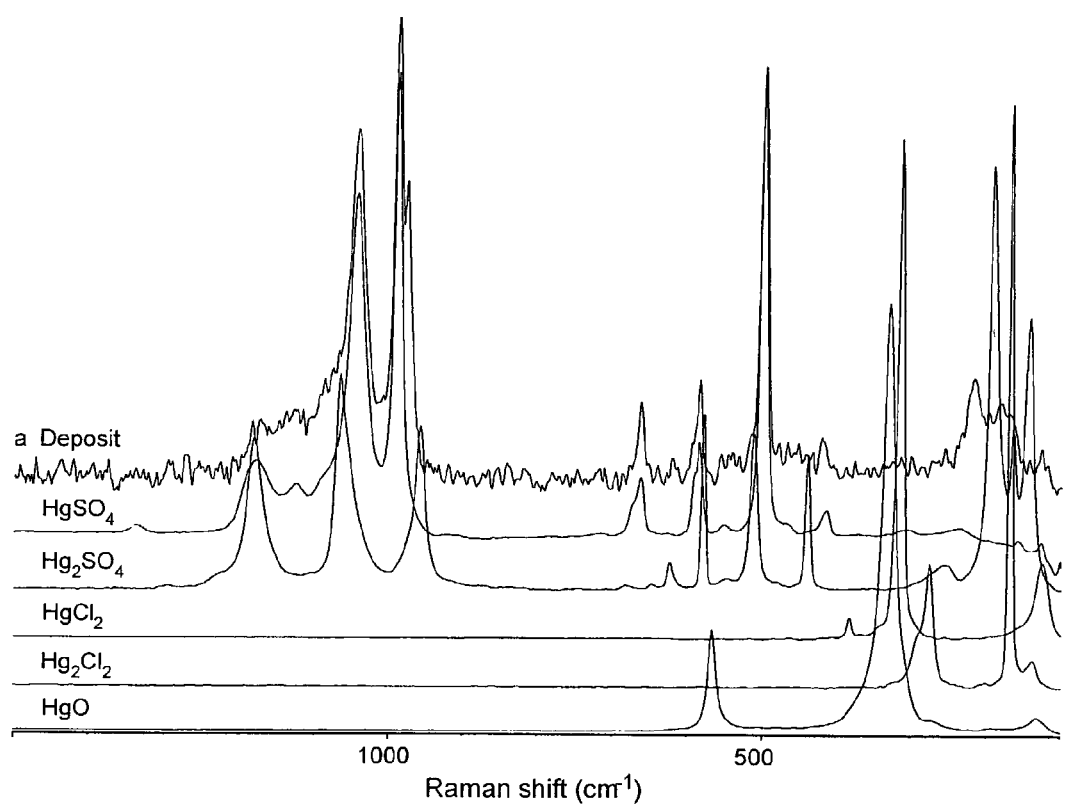
FIG. 1 is a Fourier Transform Raman spectrum of a flame generated deposit, spectrum (a), compared to similar spectra of several purchased samples of pure mercury compounds.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described herein as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described herein, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

The present invention comprises a method for mitigating mercury emissions in an exhaust gas, the method comprising facilitating the formation of mercury dichloride on a surface from a substantial portion of the mercury in the exhaust gas, subliming the mercury dichloride from the surface, and removing the sublimated mercury dichloride from the exhaust stream.

More particularly, the method for mitigating mercury emissions in an exhaust gas comprises providing a surface which is in contact with the exhaust gas, depositing a substantial portion of the mercury from the exhaust gas upon the surface, subliming the deposited mercury back into the exhaust gas, and scrubbing the sublimated mercury from the exhaust gas.

The exhaust gas may comprise elemental mercury, sulfur compounds, and a form of chlorine such as hydrogen chloride, atomic or molecular chlorine.

The surface preferably comprises a flow modifying spoiler configured to maximize gas-surface collisions. The surface preferably comprises a flow modifying spoiler disposed at a location within the flow of exhaust gases which enhances deposition of mercury thereon. The surface preferably comprises a flow modifying spoiler disposed at a location within the flow of exhaust gases where the exhaust gases have a temperature of between approximately 150° C. and 300° C., depending on the specific application. The surface preferably comprises a flow modifying spoiler disposed at a location within the flow of cool exhaust gases and wherein the surface or the gases can be heated to temperatures between approximately 150° C. and 300° C., depending on the specific application.

The surface preferably comprises a metal or ceramic material. However, as those skilled in the art will appreciate, the surface may alternatively comprise any other material upon which mercury and/or a mercury compound such as mercury dichloride will form, and from which the mercury compound will subsequently sublime.

According to one aspect of the present invention, mercury deposited upon the surface forms mercury oxide which is subsequently converted into mercury dichloride.

According to one aspect of the present invention, mercury deposited upon the surface forms mercury sulfate which is subsequently converted into mercury dichloride. The mercury dichloride then sublimes.

Optionally, sulfur dioxide is added to the exhaust gas prior to the exhaust gas contacting the surface, so as to enhance the formation of mercury sulfate and hence mercury dichloride upon the surface.

Optionally, atomic chlorine, molecular chlorine, or hydrogen chloride is added to the exhaust gas prior to the exhaust gas contacting the surface, so as to enhance the formation of mercury dichloride upon the surface.

Scrubbing preferably comprises water scrubbing, since mercury dichloride is very water soluble. However, as those skilled in the art will appreciate, the mercury dichloride may be removed from the exhaust stream by any other suitable method.

According to one aspect, the present invention comprises a device for mitigating mercury emissions in an exhaust gas, the device comprising a surface configured to be disposed within an exhaust gas stream so as to facilitate formation of a mercury compound thereupon. The device is also configured so as to facilitate sublimation of a mercury compound therefrom. The surface may have any desired configuration. However, as those skilled in the art will appreciate, the surface preferably defines a contorted or convoluted path which provides ample surface area for a substantial portion of the mercury in the exhaust stream to form mercury dichloride thereupon.

The surface is also preferably configured to facilitate the deposition of mercury sulfate thereon. Thus, the surface is preferably configured to facilitate the deposition of mercury sulfate thereon and the subsequent conversion of the deposited mercury sulfate into mercury dichloride.

The surface is preferably further configured to facilitate deposition of mercury oxide thereon. Thus, the surface is preferably further configured to facilitate deposition of mercury oxide thereon and subsequent conversion of the deposited mercury oxide into mercury dichloride.

The surface is preferably at least partially defined by a flow spoiler (flow modifier), designed to enhance the gas-surface collision frequency of mercury atoms in the flow according to well-know principles.

The present invention optionally further comprises a chlorine and/or sulfur injection system which is configured to inject atomic chlorine, molecular chlorine, hydrogen chloride, or sulfur dioxide gases into the exhaust gas prior to the exhaust gas contacting the surface.

Preferably, a scrubber removes sublimed mercury dichloride from the exhaust gas. Preferably, a water scrubber removes sublimed mercury dichloride from the exhaust gas. However, those skilled in the art will appreciate that other types of scrubbers and other devices for removing the sublimated mercury dichloride from the exhaust gas are likewise suitable.

According to one aspect, the present invention comprises an exhaust system for mitigating mercury in an exhaust gas, wherein the exhaust system comprises a smokestack and a surface within the smokestack configured to facilitate deposition of a mercury compound thereon. The surface is further configured to facilitate sublimation of mercury dichloride therefrom. A scrubber or other device is configured to facilitate scrubbing of sublimed mercury from the exhaust gas.

The present invention specifically addresses and alleviates the above mentioned deficiencies associated with the prior art. The present invention is based on the chemistry that is occurring in the exhaust gases and comprises an engineering modification of the exhaust train.

In high temperature systems, any trace impurities of mercury are known to volatize into the gas phase. This is the case in the combustion of coal, peat, sewage sludge, oil and gas. It is also the case in the incineration of municipal and medical wastes, in the retorting of oil shale, the operation of crematoriums, and also applies to various metal smelting industries, cement producers and some mining techniques. In the waste exhaust gas flows of such systems, although the concentration levels are extremely low (parts per billion by volume), when integrated on a national or global scale such emissions pose a severe environmental problem.

If, as is quite common, traces of chlorine or hydrogen chloride also are present, this gaseous mercury which is in its atomic state partially converts at some point to mercury dichloride gas. These two species, the atomic mercury and its dichloride account for the gaseous mercury in such systems.

The problem that faces contemporary technology is that although the mercury dichloride is water-soluble and can be readily removed from the exhaust gases, no satisfactory method exists for removing the atomic mercury that ultimately escapes into the environment.

Moreover, the ratio of the dichloride to the atomic mercury does not vary in a consistent manner, is not understood, is not predictable, and has not been directly correlated to anything in the system. Numerous extensive analyses of the gas phase chemistry have failed in spite of significant efforts to force the models to explain the observed data (Xu, M., et al. *Combust.*

& *Flame* 132:208(2003)). The gas phase kinetics have been extensively studied and so it is not through a deficiency of data that these models fail.

Because the chemistry starts in the high temperature gases and ends in the gas phase, it has always been considered to be a gas phase phenomena. This would at first sight appear to be reasonable, but as this present discovery has shown is not the case. All these studies have been valuable in showing that the dominant process, in fact, is not a gas phase homogeneous mechanism, but something else is happening in such systems.

Recent work in the applicant's laboratory has been examining deposition of materials from flame gases onto surfaces. A study of the detailed chemistry of sodium sulfate deposition that is responsible in combustors for causing high temperature corrosion has led to a significant understanding of that process (Steinberg and Schofield, *Twenty-Sixth Symposium on Combustion*, The Combustion Institute, 1835(1996), *Combust Flame*, 129:453(2002)).

This now has been sufficiently well understood that additives have been recommended that can disrupt the chemistry and prevent the sulfate formation (Schofield, U.S. Pat. No. 6,328,911,11/2001, *Energy & Fuels*, 17:191(2003)). In this previous process it was found that if sodium and sulfur are present even at very low concentration levels (ppmv, parts per million by volume) in the fuel or air that sodium sulfate is formed very efficiently not in the flame gases themselves but on a cooled surface intercepted by the burned gases.

These same techniques now have been applied to resolve the details of the combustion and hot gas chemistry of traces of mercury. Oxygen-rich propane fueled flames were burned containing a small addition of an aqueous aerosol of mercury nitrate or mercury acetate from an ultrasonic nebulizer. These additions produced mercury concentrations in the range of 5-30 ppmv in the burned gases.

Experiments were run either with mercury addition alone, or also with similar additions of low-levels of sulfur or chlorine, or their combination. Presently various metal collection probe surfaces maintained at temperatures in the range 50-375° C. have been immersed downstream intercepting the burned gases. Deposits were immediately apparent in all cases tested and are never elemental mercury but are molecular in nature. Using Fourier Transform Raman Spectroscopy, X-Ray Diffraction Scattering analysis, and ICP Spectral Emission analysis methods, the composition of these deposits has been resolved and their rates of formation measured.

Calibration of the quantity of mercury in the flame gases and that collected on the probe indicates the gaseous atomic mercury deposits very efficiently. In fact, the measurements surprisingly show that deposition rates of mercury are essentially the same as with alkali metal salts in flames. In the flames studied, one interaction with a surface removes a significant fraction of the gas phase mercury. When sulfur is present in the system a smooth yellow or white deposit forms.

Referring now to FIG. 1, a Fourier Transform Raman spectrum of a flame generated deposit, spectrum (a), is compared to similar spectra of several purchased samples of pure mercury compounds. The deposit was collected 6 milliseconds downstream in the burned gases of a $C_3H_8/O_2/N_2$ (0.9/5/16) flame burned on a flat flame burner and containing 25 ppmv Hg, 75 ppmv $SO_2$, and 50 ppmv $Cl_2$ in the unburned gas flows. The cylindrical metal probe was cooled internally with water and was maintained at 60° C. It was collected in two hours, thus indicating a significant collection efficiency (30%). The deposit was a uniform, smooth powder layer and was yellowish or white in color. The deposit illustrates the formation of essentially pure mercuric sulfate.

Thus, when the Fourier Transform Raman spectrum of this deposit is compared to those of known purchased samples of available mercury compounds, it is seen to be a pure deposit of mercuric sulfate.

Figure 2:
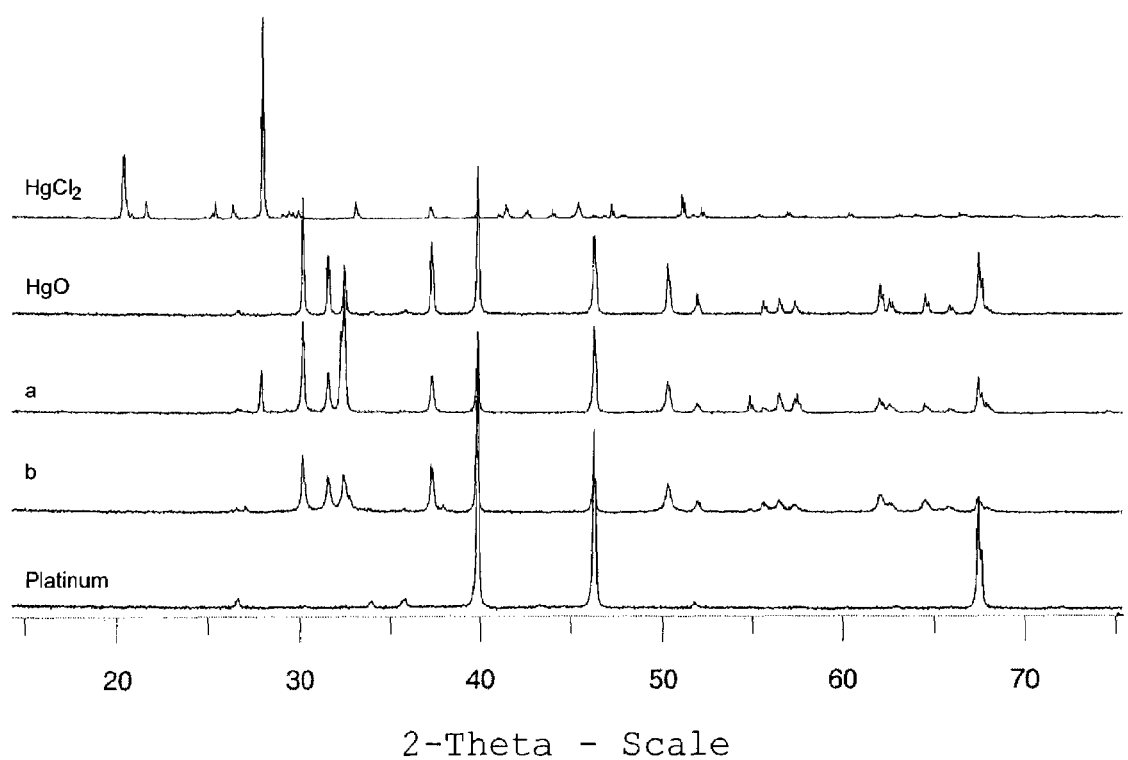
FIG. 2 illustrates various 2-Theta mode spectra taken on a Bruker D8 Powder X-Ray Diffractometer.

Referring now to FIG. 2, various 2-Theta mode spectra taken on a Bruker D8 Powder X-Ray Diffractometer are illustrated. Spectrum (a) is that of a deposit collected about 6 milliseconds downstream in the burned gases of a $C_3H_8/O_2/N_2$ (0.9/5/16) flame containing 25 ppmv Hg and 75 ppmv $Cl_2$ in the unburned gas flows. The cylindrical probe was cooled internally with water and was maintained at 60° C. It was collected in two hours, thus indicating a significant high collection efficiency. The deposit was a uniform smooth powder layer and was brown in color.

Spectrum (b) is that of a deposit collected similarly except that only mercury was added to the flame and the probe was at 55° C. It was similar in nature but a darker brown color. The quantity deposited also was larger. These are compared against corresponding spectra of purchased samples of mercuric oxide and mercuric dichloride. All samples were analyzed under identical conditions. It illustrates the formation of mercury oxide in both cases. In the absence of sulfur, such brown mercuric oxide deposits are always evident.

Spectrum (a) also indicates the presence of a little mercuric dichloride in the sample confirming its formation on the surface. The lines of platinum present in the spectra result from scattering from the platinum strip substrate on which the samples are lying.

It is clear, as with alkali deposition, that a significant heterogeneous mechanism is available to mercury. Similarly, as seen before in the previous program, the metal element, in this case mercury, is never at a loss to produce a molecular compound. On reaching the surface, however, it does have a preferential ranking for what will be formed. If sulfur is present in the gases it will form mercuric sulfate. If not, it will produce the oxide. It cannot be deposited and remain on the surface in its elemental state.

The importance of the surface is paramount. In the first place it reduces the dimensionality of the chemical system. Species that might not even collide with one another in the three dimensional gas phase now have a much increased probability of finding each other on the two dimensional surface. More importantly, as in the present case, it changes the chemistry from the gaseous to the condensed phase.

The solid phase chemistry of mercury also is more limited than with most elements. Mercury, however, displays two valences, mercurous (1) and mercuric (2), and is quite different from the gas phase. The following solid phases have been characterized:

Hg Very volatile liquid, Boiling Point 357° C. Vapor pressure 1 torr (125° C.), 7.5 torr (175° C.), 75 torr(250° C.). 760 torr equals atmospheric pressure. In exhaust gases, traces of mercury (ppbv) imply that conditions will always be above the dew point. Consequently, condensation of mercury vapor onto warm surfaces cannot occur without extremely rapid chemistry converting it and binding it in molecular form to the surface.

HgO Dissociates very rapidly at its melting point of about 500° C. Current thermogravimetric measurements show that small quantities have a thermal half-life of about 15 hours at 375° C., 8 hours at 400° C., 2 hours at 425° C. and less than one hour at 450° C. These values should only be regarded as approximate as they are not exactly zero order dependences and do depend to some degree on the size and nature of the sample.

$Hg_2Cl_2$ Sublimes and dissociates into $Hg+HgCl_2$ at 382° C.

$HgCl_2$ Melting Point 277° C., Boiling Point 304° C., stable, very volatile, vaporizes unchanged, vapor pressure 10 torr (180° C.), 50 torr(230° C.) (Bernard et al., *J. Phys. III France* 7:311(1997)). Current measurements indicate that a sample vaporizes in about an hour or less at 150° C., in about 20 minutes at 175° C., and in the matter of minutes or less at 200° C. in relatively still air.

$Hg_2SO_4$ Stable to about 335° C. when it breaks down to $HgSO_4$.

$HgSO_4$ Stable to about 475° C. (half-life about 30 hours), when it begins to dissociate to elemental mercury. Its half-life thermal stability is about 15 hours at 525° C., 6 hours at 550° C., 2 hours at 575° C. and about 30 minutes at 600° C.

HgS Cinnabar is the mineral ore found in nature. It has a boiling point of 584° C. but is not stable in hot air, breaking down to $Hg+SO_2$.

$Hg_2CO_3$ Not stable, dissociates at 130° C.

$Hg_2(NO_3)_2$ Decomposes at 70-100° C. (Can be purchased only as the dihydrate).

$Hg(NO_3)_2$ Melting Point 79° C., decomposed by light and not regarded as thermally very stable (Can be purchased only as the monohydrate salt and is very hygroscopic).

The hydride is not known, but the acetate, oxalate and cyanide can be purchased.

A reference to any classical inorganic textbook indicates that mercuric sulfate and oxide react quite readily with either hydrogen chloride or molecular chlorine producing mercury dichloride (Mellor, J. W., *A Comprehensive Treatise on Inorganic and Theoretical Chemistry*, Volume 4, John Wiley (1960)). Mercury dichloride is called a corrosive sublimate due to its high volatility.

Consequently, what is happening in the exhaust gases is not as complicated as previously thought. As the hot gases cool, the mercury is finally able to react with sulfur or oxygen on any surface that is encountered. This might even be a fly ash particle or just the flow confining ducts. As seen above in the characteristics of the various mercury molecules, too high a temperature and anything that might be formed will dissociate immediately back off any surface into the flowing gases as elemental mercury.

Consequently, depending on the specific system and the flow environment, it will not be until the temperature falls below about 600° C. (in sulfur containing systems) and below about 450° C. (in sulfur-free systems) that mercury deposition with some kind of life expectancy can be expected to occur. In the case of mercury sulfate deposits, experiments indicate that it is hydrogen chloride in the exhaust gases and not molecular chlorine that vigorously attacks and converts the deposit to mercuric dichloride on the surface.

Serendipitously, solid mercury dichloride is very volatile, melts at 277° C. and boils at 304° C. As indicated above, recent measurements imply that at 200° C. or above it will vaporize back into the flows in a matter of minutes or less. In the case of mercury oxide deposits, these are attacked both by hydrogen chloride and molecular chlorine and converted to the dichloride. However, in most combustion systems, any chlorine in the fuel is converted mainly to hydrogen chloride with only a small percentage of molecular chlorine forming in the late cooling exhaust gases.

The specific practical conditions available in a particular application of this method will control to some degree the operational temperatures. Nevertheless, higher temperatures will promote the deposit formation in the first place and ensure rapid conversion and vaporization back into the flow.

By examining deposition not far downstream in the burned flame gases (5-15 milliseconds), it has been possible to enhance the formation rates and understand the chemical processes that can occur. For example, FIG. 2 shows a mercury oxide deposit collected on a probe surface cooled to 60° C. in the burned gases not far downstream. The analysis indicates that along with mercury oxide, there is a strong x-ray line characteristic of the dichloride. In this experiment, because of the low temperature of the surface, the formation, conversion and also retention of a little of the dichloride on the surface are witnessed.

No other mercury compounds are evident in any of these deposits. This provides additional very strong confirmation of the mechanism. The chemistry appears to favor the divalent mercuric compounds.

The FT Raman spectra and the x-ray powder diffraction spectra have been taken for all the mercury compounds that are commercially available. As discussed above, some of these are illustrated in FIGS. 1 and 2. These figures show the individual nature of each molecule and the ease of identification using these combined techniques.

The mechanism is simple and extremely elegant. The fact that it can not commence until the temperatures fall below about approximately 600° C. (sulfur bearing flows) and approximately 450° C. (sulfur-free flows) imposes a time constraint in currently operating practical emission systems. This explains the very variable conversions of atomic mercury to the dichloride that have been recorded. It also explains the enhancements that are reported if additional catalytic surfaces are present as used in some nitric oxide control methods. It also explains the possible effects that have been reported with respect to additional sulfur and chlorine additions.

Based on this new and original understanding of the heterogeneous chemistry that mercury appears to favor, it is now possible to design a solution for mitigating mercury emission levels. If the atomic mercury can be induced to fully convert to its dichloride, then this dichloride can be readily removed from the exhaust gases and the subsequent emissions of mercury eliminated.

According to the present invention, a flow modifier with a large surface area is inserted into the exhaust train where the gas temperatures are beginning to approach the upper limit of the specific temperature window. It is envisioned that in most combustion systems no additions will be needed other than this basic plumbing modification. With it, the exhaust gases are made to flow so they encounter a surface as many times as possible in the specified process temperature window as the gases are cooling.

The natural levels of sulfur and chlorine in most fuels are orders of magnitude larger than those of mercury and will be sufficient to drive the mechanism in most cases. In systems that have no fuel-chlorine, it will be necessary to add hydrogen chloride to the burned gases at levels such that the exhaust gases in the flow device surface region contain concentrations of hydrogen chloride that are several parts per million by volume.

In sulfur-free systems, additions of traces of sulfur dioxide might also be considered to invoke the observed wider temperature window of the sulfate deposit formation. Moreover, if the exhaust gases are too cool, the mechanism can be induced by heating the device section or the exhaust gases in that region to the appropriate level.

The material of the inserted flow modifier or spoiler and its surface structure is not critical. It can be either metal or ceramic in nature. Its design similarly is not critical. It is solely to modify the flow pattern and provide an enhanced surface area to ensure that all the exhaust gases can come into contact with some surface many times while the gases are cooling. Passages that swirl and mix the gases, while at the same time force them to impinge on surfaces without producing noticeable flow restrictions are preferred.

The positioning of the flow modifier or spoiler in a system is important. In coal combustor applications, it is necessary to utilize those sections where the temperature of the exhaust gases lies in the correct operational window. For coal this appears to be in the approximate range 150° C. to 300° C. or slightly higher, depending on the equivalence ratio and the composition of the exhaust gases. Too low a temperature and the sulfate or oxide will not form. Too high a temperature and the deposit can be reduced back to atomic mercury. This is generally not by thermal dissociation, but more likely by chemical reduction. This stems from the traces of potentially reducing gases such as carbon monoxide or hydrogen that may still remain in the exhaust gases of fuel-lean combustors.

Because the mercury attaches and forms a molecule on the surface that is then converted and sublimed back off the surface, minimal maintenance may be expected. The surface is solely providing the medium by which a heterogeneous mechanism permits the mercury to attain its thermodynamically preferred gaseous mercuric dichloride state. However, because in some cases the flow modifying device will possibly be ahead of the electrostatic precipitators, some slight build-up of fly ash deposits may need to be removed occasionally.

The present research is the first study that investigates both qualitatively and quantitatively the deposition chemistry of low concentration levels of gaseous mercury from exhaust gases onto solid surfaces.

It is well established that mercury is in its gaseous atomic state in the exhaust gases from the combustion of fuels that contain traces of mercury compounds. This is also the case in any high temperature system, such as metal smelting, where similar traces of mercury may be present in the process. Mercury is most commonly encountered in its liquid state. Its vapor pressure at various temperatures has been listed above and illustrates its significant volatility. It is probably because of this fact and that mercury concentrations in such exhaust system are always much below its dew point, that the possibility of deposition chemistry has never before been considered. Based solely on condensation concepts, mercury should never remain on any surface in such systems.

However, as found in recent research with flame deposition of alkali metal compounds onto surfaces, dew point can lose its general meaning. Chemically driven deposit formation can override any such considerations. A combination of surface affinity and very rapid chemistry can control an atom on the surface long enough for it to convert to a stable molecular form. This appears to occur in times shorter than the normal kinetic rebound of the atom off the surface.

It has been noted in practical exhaust systems that the atomic mercury is not reactive, the majority of it passing through the flow ducts and being emitted to the atmosphere as an environmental hazard. However, it is also known that a small fraction is converted to gaseous mercury dihalide by chemistry that can not be described by any prior art. This conversion has never been understood but is of extreme importance.

Whereas it is very difficult to remove the atomic mercury from exhaust gases, mercury dichloride is readily soluble in water and can be effectively controlled. Because the gaseous atomic mercury and the gaseous mercury dichloride appear to constitute the mercury mass balance in such systems, the chemistry has always been analyzed in terms of the gas phase. However, the inadequacy of such chemical schemes to explain any of the prior art has indicated that additional mechanisms are playing an important role. The present research has identified that this additional chemistry is heterogeneous in its nature.

Any surface, in the correct temperature window, can act as a transient medium facilitating, through the condensed phase, this conversion to dihalide. This new depth of understanding is the basis for the presently outlined process to effectively control mercury emissions.

The mercury deposition chemistry has been examined using a well-defined flame/burned gases system. The flame burner and associated system have been described in previously published work (Steinberg and Schofield, *Twenty-Sixth Symposium (International) on Combustion*, The Combustion Institute, Pittsburgh, Pa., 1835 (1996), Schofield, *Combustion & Flame*, in press, volume 132 (2003)). The burner produces a one-dimensional cylindrical atmospheric pressure flame.

Propane, oxygen, nitrogen flames have been examined over a range of fuel-lean and fuel-rich equivalence ratios. Mercury is introduced into the unburned gas flows as a fine aqueous aerosol from an ultrasonic nebulizer. Solutions of mercuric nitrate and mercuric acetate at strengths from 0.008 to 0.05 N have been used and produce concentrations of atomic mercury in the flame burned gases of up to about 30 ppmv. This gives measurable probe deposition rates of several milligrams of mercury per hour. By varying the solution strength, differing flame concentrations can be studied. Small and variable quantities of sulfur or chlorine also can be added using certified cylinder mixtures of 0.1% $SO_2$ in $N_2$, 514 ppmv $Cl_2$ in $N_2$, and 1000 ppmv HCl in $N_2$. Calibrated electronic mass meters control all gas flows.

Several cylindrical collection probes have been used. These are about 12 mm in diameter and essentially interact with all the seeded burned gas flow. The flame is essentially an inner cylindrical laminar flow that contains the additives and is surrounded by a co-flowing identical flame with no additives. This outer shield flame makes for a uniform cross section of the inner flame and helps to stabilize it. At a certain distance downstream from the burner top, each point is at the same time after combustion and is similar in nature. This is valuable in studies that examine downstream time dependences, such as those resulting from non-equilibrium flame effects.

The probes are of Inconel-600 stainless steel with a central channel for air or water cooling and have a built in thermocouple in the wall thickness to monitor surface temperature. One is very tightly clad with a surface of two micron thick foil of platinum. The probes are mounted horizontally in the vertical hot gas flame flows and the burner is raised or lowered by a computer controlled stepper-motor. In this way samples can be collected at various downstream times. In the propane flames examined at present with these particular probes such times are generally in the 5-15 millisecond range. Probe temperatures have been varied from 55-375° C.

Important additional experiments have utilized probes that can be internally heated. One is also of Inconel-600 stainless steel, with an internal heating element, a channel for air cooling and a built-in thermocouple. Such probes are useful in facilitating numerous experiments that more realistically simulate the cooler exhaust gas chemistry. They have been used in the burned flame gases at downstream times of about 0.1 second, by which time the gases have cooled considerably and the natural flame atoms and radicals have decayed extensively.

By heating a probe, realistic lower threshold temperatures for oxide and sulfate formation in cooler exhaust gases can be assessed together with an examination of any sulfur dependences. Also, by first obtaining a known quantity of either mercuric sulfate or oxide deposit on such a probe, the flame can then be extinguished and replaced by a cool flow of traces of molecular chlorine or hydrogen chloride in nitrogen. The probe can then be heated to various temperatures. In this way, rates of conversion of the oxide or sulfate deposit have been measured as a function of chlorine type (molecular chlorine or hydrogen chloride), its concentration and the surface temperature.

A powerful combination of analytical techniques has permitted an essentially total analysis of this deposition and conversion process. A Nicolet Magna 850 Series II Fourier Transform Raman Spectrometer has been used to take the spectra of any deposits that are white or yellow in color. FIG. 1 illustrates its value in this respect. For samples that are dark in color and produce only a black-body continuum spectrum with the FT Raman, X-ray analysis has been used. A Bruker D8 High Temperature Powder X-Ray Diffractometer was used as shown in FIG. 2. The X-Ray Diffractometer not only records the spectrum as illustrated in FIG. 2, but can also observe the sample with time if it is gradually heated to other temperatures.

The quantitative analyses have utilized a Thermo Jarrell Ash Iris ICP/AES Spectrometer. Samples have been collected for a known length of time. These then have been brought into a known volume of solution by dissolving them off the probe with dilute nitric acid. The diluted solution is then analyzed quantitatively by the ICP for its mercury and sulfur contents. The instrument is very sensitive and can analyze samples collected in 30 minutes from flames containing 10 ppmv mercury with an accuracy to a few percent. This is not only invaluable for measuring rates of deposit and conversion of mercury sulfate and oxide but also in establishing the mercury/sulfur ratio in the deposit.

An Orion chloride ion electrode also has been used to measure for any mercuric chloride that might remain on the surface in flame studies where the surface is maintained at a very cool temperature. In normal situations where the exhaust gases and the surfaces are above 200° C. the mercury dichloride sublimes off the surface almost instantly.

To assess the thermal stabilities of mercury oxide, sulfate and the dihalide, numerous experiments also have utilized a Mettler TGA/sDTA 851e Thermogravimetric Analyzer. This can examine the stability of a material through either a specified temperature program or at one isothermal condition. This has indicated roughly the expected lifetimes of these molecules in a relatively quiescent flow environment.

In relationship to practical flow systems these constitute upper limit values and may be modified to some degree by the actual magnitude of the exhaust gas flow velocities. Nevertheless, they have been very useful in planning experiments to ascertain the maximum temperatures for the operational windows for the sulfate or oxide formation channels. However, it has been found that the upper operational temperature limit generally will not be controlled by the thermal stabilities of the sulfate or oxide. In numerous combustion systems it is the remaining traces of unburned carbon monoxide and hydrogen that can react with the deposit and reduce it back to elemental mercury that have the controlling role. It is this kinetic competition between the conversion to the dichloride and the rate of reduction back to elemental mercury that will control the exact value for the upper limit of the possible temperature window.

In coal combustors, the flue gases can typically contain 1-20 ppbv of atomic mercury, 10-100 ppmv of hydrogen chloride and about 300-3000 ppmv of sulfur dioxide. These levels obviously are very approximate but illustrate that the concentration ordering is generally sulfur has a much greater concentration than chlorine and chlorine has a much greater concentration than mercury. Moreover, fuel chlorine converts to about 90% hydrogen chloride and 10% atomic chlorine in the near burned gases. By the time this reaches the cooling exhaust gases, it is almost all hydrogen chloride and only about 1% of molecular chlorine.

Experiments that flowed traces of these two gases over deposits of mercury sulfate and chlorine at 200-250° C. confirmed that hydrogen chloride does play the major role. The sulfate is unaffected by molecular chlorine, a fact predicted by the thermodynamics of the reaction. Consequently in any alternate application of this method to a system that happens to be chlorine free, a correct choice is needed between hydrogen chloride and molecular chlorine additions before low level additions of these are made to facilitate the conversion chemistry.

Results of the present studies indicate that the rates of deposition of mercury vary in a linear fractional dependence with the quantity of mercury added (first order) for both oxide and sulfate formation. Measured rates (calculated as the weight of mercury/hour in the deposit) are independent of surface material (stainless steel or platinum) and are the same whether the oxide or the sulfate is formed. The inflow of atomic mercury to the surface is obviously one of the major controlling parameters. In fact, the rates of deposition of mercury on a molecular basis appear essentially very similar to those of alkali metals in spite of its much larger atomic weight.

There is no indication that mercury dichloride forms directly on the surface. It is likely a secondary product being produced on the surface from either the sulfate or the oxide which act as its precursor. This is likely a consequence of their greater thermal stabilities that provide for a lengthened lifetime on the surface at temperatures otherwise too high for the very volatile dichloride.

Generally, the insertion of the unheated probes has been made at downstream times of about 5-15 milliseconds. Although the flame gases are close to chemical equilibrium at these times, the experiments are not strictly a valid simulation of normal exhaust gases that have temperatures of only several hundred degrees or so and are at much longer downstream times.

Consequently, although the chemical mechanism has been identified utilizing the flame gases not far downstream from the reaction zone, the temperatures at which the process will operate in much cooler exhaust gases have to be determined by additional experiments. Although deposits of oxide and sulfate have been obtained at 10 milliseconds downstream times in fuel lean propane flames on a probe at 60° C., this likely will not occur in much cooler exhausts. Higher surface temperatures will be necessary in cooler exhaust gases to overcome any surface energy barriers that the formation chemistry may have. It is in this connection that tests have been made with the heated probes located at about 0.1 second downstream in cool exhaust gases.

These experiments, together with those that flow either traces of hydrogen chloride or molecular chlorine over deposits of the sulfate or oxide on the same heated probes, are extremely important and constitute close simulations of practical systems. They accurately define the necessary temperature window where the flow device must be located in-the exhaust stream for optimal performance.

In systems where mercury sulfate deposits are induced, a larger operational window exists than for the oxide (sulfur-free case). The lower limit is controlled by the formation chemistry and needs a temperature of about 150° C. to overcome the formation activation energy. Two aspects, the thermal dissociation rate, and the rates of potential reactions that can chemically reduce the sulfate deposit back to elemental mercury control the upper limit. In the cooling exhaust gases from fuel-lean combustors there do remain rather low trace concentrations of carbon monoxide and molecular hydrogen that appear to be involved. In the present systems tested, these trace potential reducers have more control than questions relating to rates of thermal dissociation. Consequently, there is a kinetic competition between the hydrogen chloride that is rapidly converting the sulfate to the dichloride and these reducing reactions that are reverting the deposit back to elemental mercury. This controls the upper temperature limit that appears to approximate to about 300° C. in the present experimental systems. In this window of 150-300° C. the thermal dissociation rates are negligible. The more oxygen-rich the combustion equivalence ratio, the more this upper temperature limit may be raised. Experiments with the more reducing exhaust gases from fuel-rich flames clearly illustrate this aspect. Under such conditions no deposits of sulfate or oxide are evident for any collection temperature. With a functioning window of 150-300° C., mercury dichloride formation and vaporization is rapid and is not a rate controlling parameter. If for any reason the system is deficient in fuel chlorine, traces of hydrogen chloride can be added ahead of the device to promote the conversion.

In systems free of sulfur, mercury oxide deposits can result. The oxide deposits similarly do not appear to be controlled by their thermal stability but by their vulnerability to reduction by any trace reducing gas that may be present in the exhaust gases. Whereas deposits can be obtained easily in the upstream burned gases, there is a chemical energy threshold for its formation at the cooler temperatures in the downstream exhaust gases. As a result, a narrower functioning window appears to be available for oxide deposits in the presently tested systems. This centers on 200° C. with about a 25° C. range on either side. Consequently, in some cases, the sulfate channel with its potentially broader temperature window may be more attractive even in sulfur-free systems.

Thus, the present invention comprises a method and apparatus whereby traces of gaseous mercury can be effectively removed from cooling exhaust flue gases of any combustion or high temperature process. The mercury is converted to gaseous mercuric dichloride. Being water soluble, emissions of the latter can be controlled or mitigated by scrubbing. This method results from identifying and understanding for the first time the heterogeneous chemistry that can convert gaseous atomic mercury to gaseous mercuric dichloride in such systems.

It is now possible to present an engineering solution for this emissions problem. This is comprised of a flow modifier inserted at a location in the exhaust train where the temperature has fallen below about 300° C. in flows that contain traces of sulfur, and below about 250° C. in sulfur-free exhausts, but is still at or above about 150° C. It is designed such that it has a large surface area to the flow and agitates the flow to ensure that all components of the flue gases interact with its surfaces several times during the transit through its flow channels.

The gaseous atomic mercury has been shown to deposit efficiently on such surfaces as mercuric sulfate in systems that contain traces of sulfur, or as mercuric oxide if sulfur-free. Either of these deposits then is vigorously attacked by traces of hydrogen chloride, and also chlorine in the latter case, gases that are generally present in such flue gases. This converts the deposit to mercuric dichloride, a very volatile compound, that rapidly sublimes back into the flow stream. As mentioned above, the nature of the flow modifier material is not critical.

The rate of conversion to the dichloride and its sublimation are dependent on flue gas temperature and the trace concentration levels of hydrogen chloride and molecular chlorine gases. In the temperature windows suggested above, these will not normally be controlling parameters. The necessary surface area, sizing, positional location and length of this flow spoiler required to optimize the conversion will depend on the specific application and its operating temperatures.

For coal, biomass, oil shale, peat, wood, municipal and hospital wastes and crematorium combustors, generally there will be sufficient chlorine in the fuel to convert the mercury deposits. In some high temperature processes, such as metal smelters, that are chlorine-free, it will be necessary to add traces of hydrogen chloride or molecular chlorine so that their concentrations are on a ppmv level in the flue gas region just upstream of the device.

In sulfur-free systems where it is desirable to invoke the broader temperature window of the sulfate intermediate, similarly traces of sulfur dioxide can be added just upstream of the device. In systems where the exhaust gases are cooler than the functioning temperature window it will be necessary to heat the inserted flow spoiler or the gases to the required temperatures. The system is expected to operate maintenance free other than periodically removing any potential fly ash accumulations.

Figure 3:
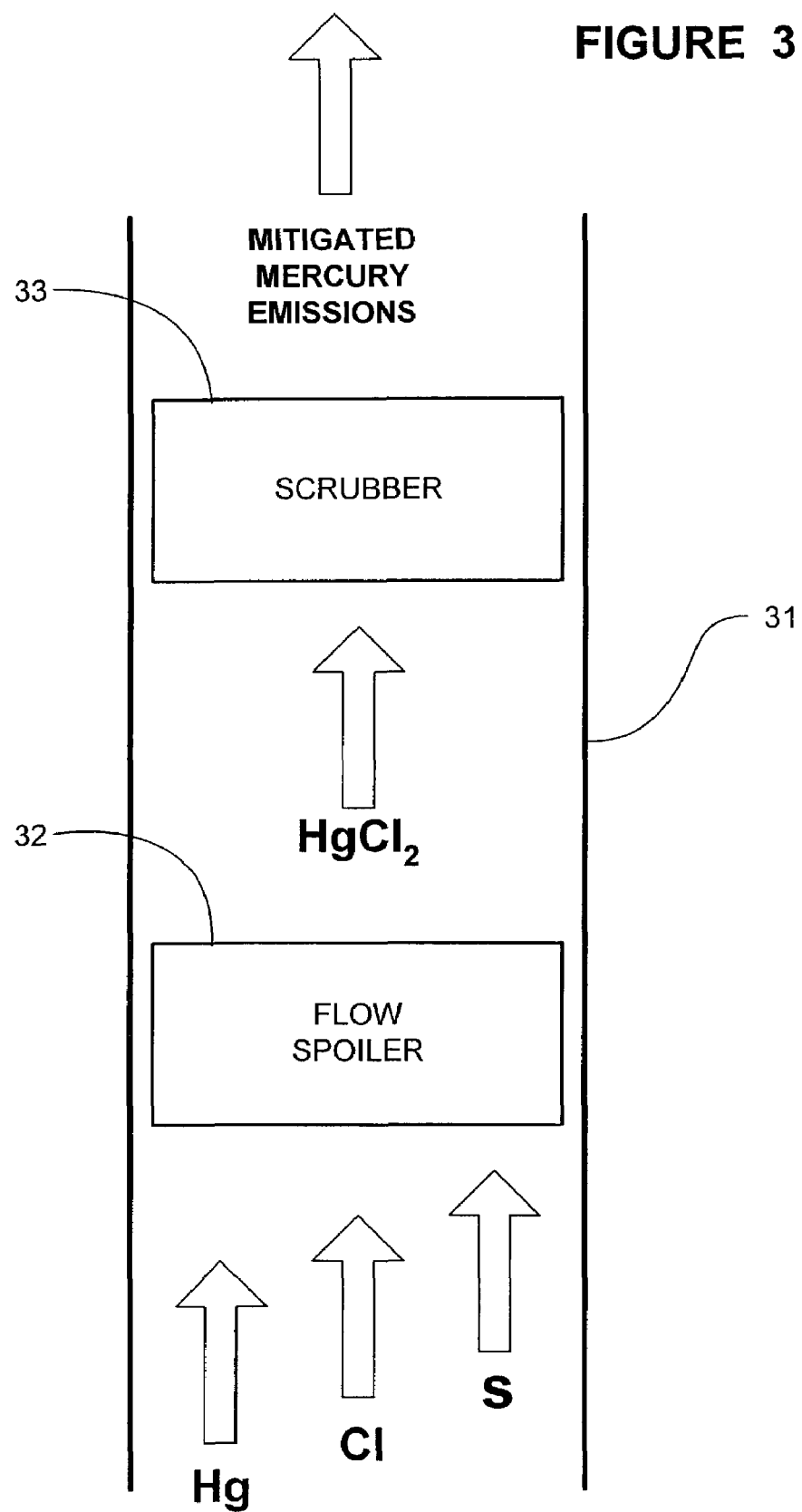
FIG. 3 is a semi-schematic diagram showing a flow spoiler and a scrubber disposed within a smokestack for mitigating mercury emissions in the exhaust gases thereof, according to the present invention.

Referring now to FIG. 3, a smokestack 31 facilitates the emission of exhaust gases from a burner, boiler, heater, steam generator or the like. Such exhaust gases include mercury and/or mercury compounds, chlorine and/or chlorine compounds and sulfur and/or sulfur compounds.

A flow spoiler 32 is disposed in the exhaust gas flow of the smokestack. The spoiler 32 is preferably configured in a manner which readily facilitates the impingement of gas molecules thereon. That is, the spoiler preferably has a substantial amount of surface area in contact with the exhaust gases. Such spoilers may be constructed according to well-known principles.

As discussed above, mercury and/or mercury compounds, chlorine and/or chlorine compounds and sulfur and/or sulfur compounds in the exhaust gases facilitate the formation of mercury dichloride upon the surface of the spoiler 32. The mercury dichloride then sublimes from the spoiler 32 and re-enters the exhaust stream.

Since mercury dichloride is water soluble, a water scrubber 33, disposed downstream from the spoiler 32 within the smokestack 31, scrubs the mercury dichloride from the exhaust gases, thereby mitigating undesirable mercury emissions in the exhaust gases.

Many, alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described herein as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described herein, what is conceptionally equivalent, what can be obviously substituted and also what essentially incorporates the essential idea of the invention.

Thus, these and other modifications and additions may be obvious to those skilled in the art and may be implemented to adapt the present invention for use in a variety of different applications. It is understood that changes in the specific structure described may be made within the scope of the claims, without departing from the spirit of the invention.

It is understood that the exemplary method and apparatus for mitigating mercury emissions in exhaust gases described herein and shown in the drawings represents only a presently preferred embodiments of the invention. Indeed, various modifications and additions may be made to such embodiments without departing from the spirit and scope of the invention. For example, intermediate mercury compounds other than mercury dichloride may be found which are removable by scrubbing or by a similar process. Further, the principle of the present invention may be extended to the removal of various other components of exhaust emissions and the like.

Thus, these and other modifications and additions may be obvious to those skilled in the art and may be implemented to adapt the present invention for use in a variety of different applications. It is understood that changes in the specific structure described may be made within the scope of the claims, without departing from the spirit of the invention.

The invention claimed is:

1. A method for continuously converting mercury in an exhaust gas into mercury dichloride in a proportion effective for removal of the mercury from the exhaust gas comprising the steps of:
   contacting a substantial portion of the exhaust gas with one or more steel two dimensional spoiler surfaces at a temperature between about 150° C. and 300° C. wherein mercury compounds deposit on the steel surface and sublime back into the exhaust gas as volatile mercury dichloride; and
   scrubbing the exhaust gas to remove the mercury dichloride.

2. The method of claim 1 where contacting a substantial portion of the exhaust gas comprises contacting a substantial portion of the exhaust gas with a steel two dimensional spoiler surface composed of a material which does not require rejuvenation.

3. The method of claim 1, where contacting a substantial portion of the exhaust gas comprises contacting a substantial portion of the exhaust gas with one or more flow modifying surfaces to enhance gas/surface contact, and disposed at a stationary location or locations within the flow of exhaust gas wherein the exhaust gas maintains the one or more steel surfaces at a temperature between about 150° C. and 300° C.

4. The method of claim 1, where contacting a substantial portion of the exhaust gas comprises contacting a substantial portion of the exhaust gas with one or more flow modifying spoilers wherein the temperature of the corresponding one or more steel surfaces are cooled to a temperature between about 150° C. and 300° C.

5. The method of claim 1, where contacting a substantial portion of the exhaust gas comprises contacting a substantial portion of the exhaust gas with one or more flow modifying spoilers wherein the temperature of the steel surfaces are heated to a temperature between about 150° C. and 300° C.

6. The method of claim 1 further comprising the step of adding sulfur, in one of its chemical forms, to the exhaust gas prior to the step of contacting, if it is not present in the gas flow already in a concentration in excess of that of the mercury.

7. The method of claim 1 further comprising the step of adding chlorine, in one of its chemical forms, to the exhaust gas prior to the step of contacting, if it is not present in the gas flow already in a concentration in excess of that of the mercury.

8. The method of claim 1, wherein the step of scrubbing comprises water scrubbing or chemical dry scrubbing.

9. The method of claim 1, wherein contacting a substantial portion of the exhaust gas comprises contacting a substantial portion of the exhaust gas with the one or more stationary steel two dimensional spoiler surfaces disposed in a flow of exhaust gas so that the frequency of molecular interactions between the surfaces and the exhaust gas is increased.

10. The method of claim 9, where contacting a substantial portion of the exhaust gas comprises flowing substantially all of the exhaust gas onto one or more spatially fixed steel two dimensional spoiler surfaces.

11. A method for continuously converting mercury in an effective proportion in an exhaust gas into volatile mercury dichloride comprising the steps of:
   contacting a substantial portion of the exhaust gas with at least one steel two dimensional spoiler surface having a temperature between about 150° C. and 300° C.;
   depositing mercury compounds on the at least one stationary steel surface;
   converting the deposited mercury compounds into mercury dichloride; and
   subliming the mercury dichloride on the at least one steel surface back into the exhaust gas.

* * * * *